United States Patent
Colasanto

(10) Patent No.: US 6,190,482 B1
(45) Date of Patent: Feb. 20, 2001

(54) METHOD FOR LAMINATING TEXTILES

(75) Inventor: Thomas C. Colasanto, Vernon, CT (US)

(73) Assignee: Enterprise Coatings, North Smithfield, RI (US)

( * ) Notice: Under 35 U.S.C. 154(b), the term of this patent shall be extended for 0 days.

(21) Appl. No.: 09/363,197

(22) Filed: Jul. 29, 1999

(51) Int. Cl.[7] .............................. B32B 31/12; B32B 3/10
(52) U.S. Cl. ..................... 156/177; 156/179; 156/230; 156/249; 156/289; 156/291; 427/208.6; 427/282
(58) Field of Search ..................................... 156/177, 179, 156/230, 249, 289, 290, 291, 292, 238, 241, 344; 427/208.4, 208.6, 282

(56) References Cited

U.S. PATENT DOCUMENTS 4,163,822 * 8/1979 Walter .

* cited by examiner

*Primary Examiner*—Sam Chuan Yao
(74) *Attorney, Agent, or Firm*—Kenyon & Kenyon

(57) ABSTRACT

A process of laminating textiles for producing air-permeable or moisture-permeable laminated textile materials involves generating a discontinuous layer of adhesive with a precise pattern of voids by means of temporarily introducing sets of parallel yarns or, alternatively, mesh-like webs in contact with an initially uniform layer of adhesive temporarily carried on a release-coated carrier. After the adhesive layer and the mesh-like web have been pushed into contact with a first fabric layer, the release-coated carrier is stripped away, along with the mesh-like web, from the first fabric layer. The adhesive layer remaining on the first fabric layer will exhibit a discontinuous pattern that is complementary to the mesh-like web pattern. Subsequently, a second fabric, or film, is bonded to the exposed adhesive surface on the first fabric to create a laminated material exhibiting air permeability or moisture permeability. The laminating process according to the present invention significantly increases the ability to control the extent and pattern of voids in the adhesive layer of a laminated fabric material without incurring significantly added cost or time for manufacturing. The increased ability to control the extent and pattern of voids results in several benefits. When two fabric layers are laminated using the process according to the present invention, the process enables accurate control of the resulting laminate's wind resistance to specific target values. Furthermore, the process enhances control over the resulting laminate's handle and drape. When a fabric is laminated to a barrier film, the process according to the present invention enables accurate control of adhesive coverage/pattern to easily balance the bond strength against the following conflicting properties: a) moisture-vapor permeability, when a moisture vapor permeable film is used as one of the laminate layers; and b) soft handle and drape.

20 Claims, 3 Drawing Sheets

METHOD FOR LAMINATING TEXTILES

FIELD OF THE INVENTION

The present invention relates generally to a method of laminating multiple layers of textile and/or polymer materials together, and relates particularly to a method of laminating multiple layers of textile and/or polymer materials by means of an adhesive layer into which a void pattern has been introduced.

BACKGROUND OF THE INVENTION

In producing a "breathable" textile material, it is known in the art to laminate a substrate fabric to a second layer of material by means of an adhesive layer. In order to impart certain permeability characteristics to the resulting laminates, e.g., air permeability or moisture permeability, it is also known in the art to apply the adhesive discontinuously, i.e., leave certain areas of the laminates unbonded. A variety of bonding methods have been utilized in the past to achieve the aforementioned discontinuous adhesive layer, but these methods suffer from significant disadvantages.

One method disclosed in U.S. Pat. Nos. 5,342,469 and 5,705,011 involves introduction of a discontinuous adhesive in the form of linear filaments between the fabric layers to be laminated. An obvious drawback of this method is that there is no way to control the number and locations of the voids in the adhesive layer. Another method disclosed in U.S. Pat. No. 5,560,974 involves applying an adhesive layer at discrete, spaced-apart locations, which adhesive layer may form a series of spots or a lined pattern. Other techniques which have been utilized in attempts to create a discontinuous adhesive layer between laminate layers include controlled extrusion through a die applicator, rotogravure, dot gravure, flexographic, screen printing, melt-blowing and ink-jet printing. An exemplary technique, disclosed in U.S. Pat. No. 4,761,324, involves the use of a printing roll that has a void pattern. In this known technique, the printing roll transfers the adhesive to the fabric only where the roll contacts the fabric. In screen printing, selected sections of the screen are blocked off and adhesive is applied through the remaining portions of the screen.

The above-mentioned prior art techniques have some significant cost and technical disadvantages. Regarding the printing-roll adhesive application method and the screen-print adhesive application method, engraving new or modified patterns into metal/ceramic rolls or screens is costly. Furthermore, roll changes required between successive adhesive-application jobs are very time consuming, requiring adhesive cleanups. In addition, fine, adhesive void patterns are difficult to achieve, especially when a thick adhesive layer is desired. Regarding the process for controlled extrusion of adhesive through a die applicator, the initial capital investment for the necessary equipment is relatively high. Furthermore, fine adhesive void patterns are difficult to achieve with this method.

Accordingly, it would be desirable to have a method for applying a discontinuous layer of adhesive for textile lamination, which method eliminates the disadvantages associated with previously known techniques.

SUMMARY OF THE INVENTION

In accordance with the present invention, a process of laminating textiles for producing air-permeable or moisture-permeable laminated textile materials involves generating a discontinuous layer of adhesive with a precise pattern of voids by means of temporarily introducing sets of parallel yarns or, alternatively, cris-crossing sets of parallel yarns or a mesh-like web in contact with an initially uniform layer of adhesive temporarily carried on a release-coated carrier. After the adhesive layer and the mesh-like web have been pushed into contact with a first fabric layer, the release-coated carrier is stripped away, along with the mesh-like web, from the first fabric layer. The adhesive layer remaining on the first fabric layer will exhibit a discontinuous pattern that is complementary to the mesh-like web pattern. Subsequently, a second fabric, or film, is bonded to the exposed adhesive surface on the first fabric to create a laminated material exhibiting air permeability or moisture permeability.

The laminating process according to the present invention significantly increases the ability to control the extent and pattern of voids in the adhesive layer of a laminated fabric material without incurring significantly added cost or time for manufacturing. The increased ability to control the extent and pattern of voids results in several benefits. When two fabric layers are laminated using the process according to the present invention, the process enables accurate control of the resulting laminate's wind resistance to specific target values. Furthermore, the process enhances control over the resulting laminate's handle and drape. When a fabric is laminated to a barrier film, the process according to the present invention enables accurate control of adhesive coverage/pattern to easily balance the bond strength against the following conflicting properties: a) moisture-vapor permeability, when a moisture vapor permeable film is used as one of the laminate layers; and b) soft handle and drape. Furthermore, the process according to the present invention is able to impart novel surface patterns and textures to the film layer.

DETAILED DESCRIPTION OF THE INVENTION

Figure 1:
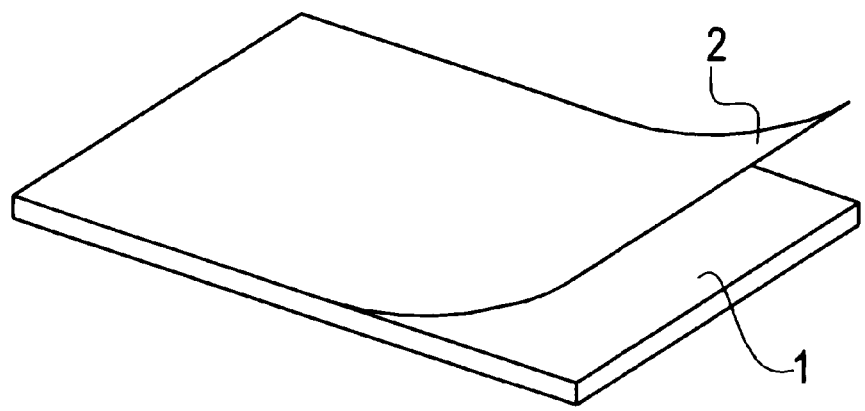
FIG. 1 illustrates a uniform layer of adhesive applied to a release-coated carrier film used in the process according to the present invention.
Figure 2:
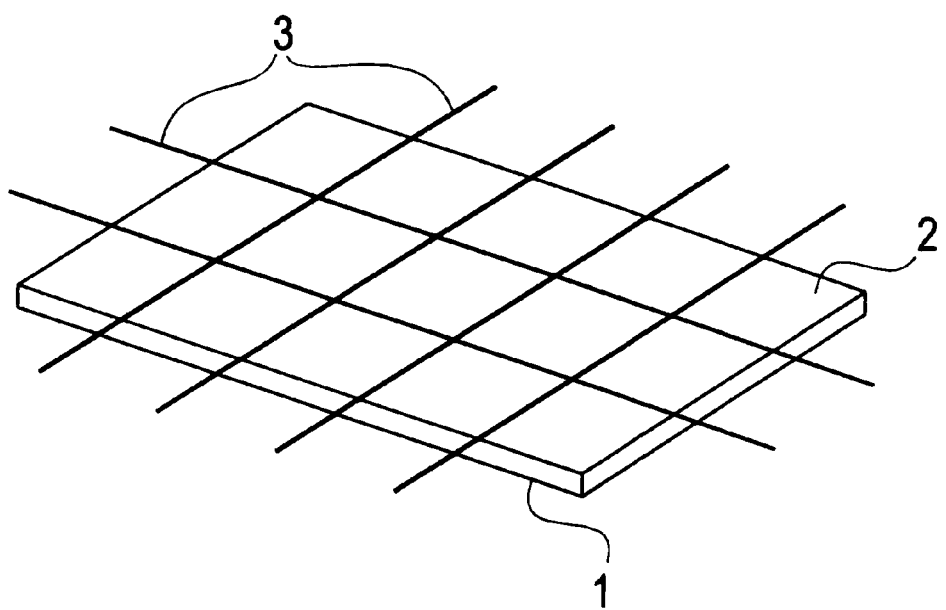
FIG. 2 illustrates a step of applying a mesh-like web on the uniform layer of adhesive illustrated in FIG. 1.
Figure 3:
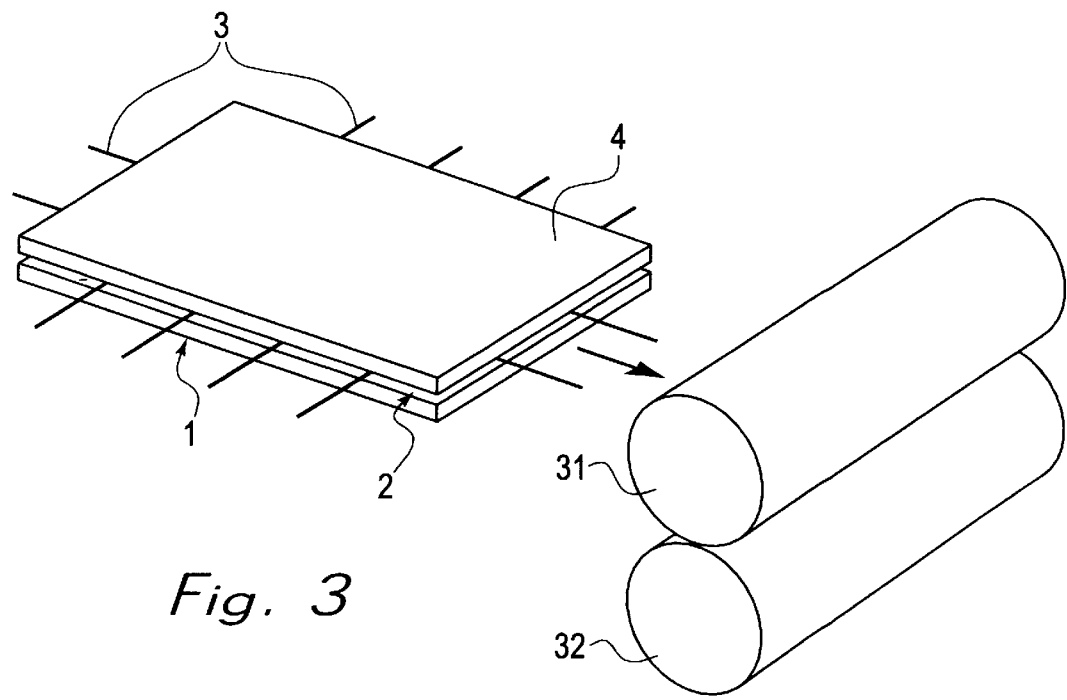
FIG. 3 illustrates a step of applying the web/adhesive combination illustrated in FIG. 2 to a first fabric layer by means of opposing rollers.
Figure 5:
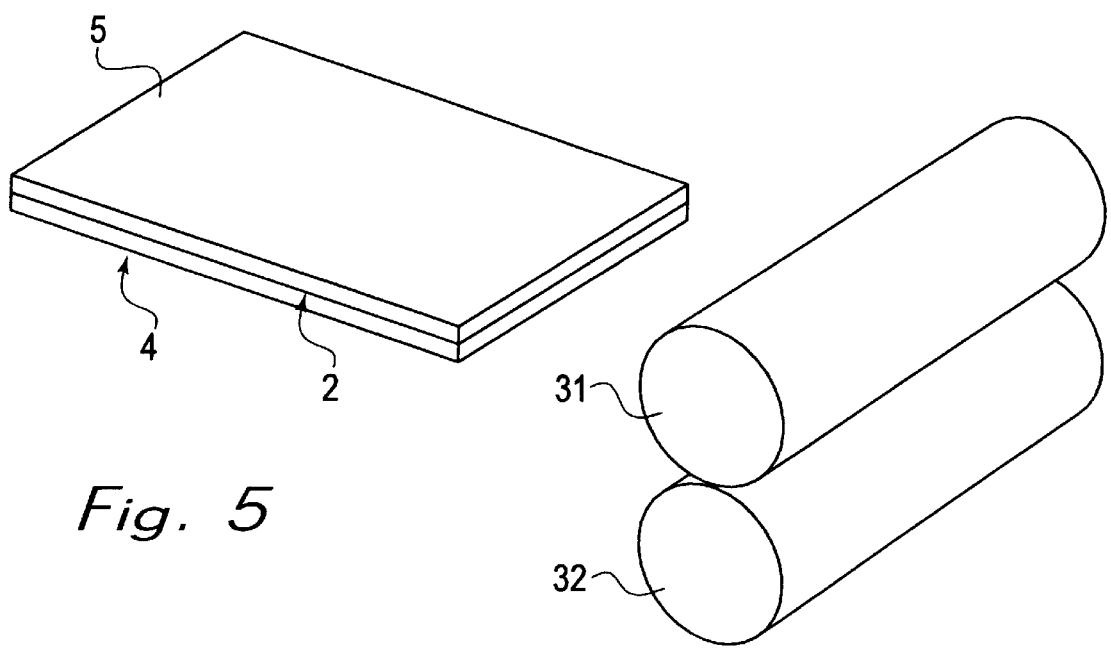
FIG. 5 illustrates a laminate product resulting from applying a second fabric layer to the first-fabric-layer/patterned-adhesive-layer combination shown in FIG. 4 by means of opposing rollers.
Figure 6:
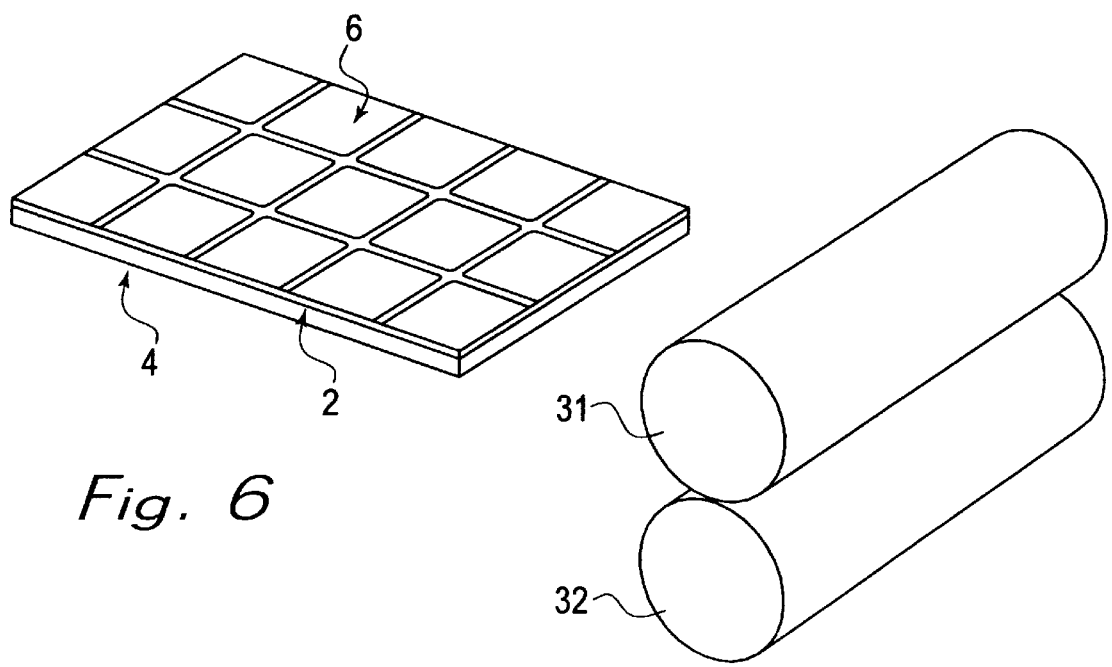
FIG. 6 illustrates a laminate product resulting from applying a transparent film layer to the first-fabric-layer/patterned-adhesive-layer combination shown in FIG. 4 by means of opposing rollers.

In applying the process according to the present invention to generate a laminated fabric product, the following exemplary materials may be used: a release coated carrier 1, shown in FIG. 1; a pressure-sensitive and/or heat-sensitive adhesive 2, also shown in FIG. 1; an air-permeable substrate fabric 4 as a first laminate layer, shown in FIG. 3; elongated, crisscrossing sets of parallel yarns or a mesh-like web (scrim) 3, shown in FIG. 2; and a second laminate layer, which may be another air-permeable fabric 5, shown in FIG. 5, or a flexible polymeric film 6, shown in FIG. 6. The release-coated carrier 1, which may be a silicone-treated polypropylene film, is used as a temporary substrate onto which a uniform layer of adhesive is cast. Although a release-coated carrier is described herein, it should be noted that any carrier, including those without release coating, which exhibits suitable release characteristics may be used. The air-permeable fabrics 4 and 5 may be selected from one of the following: a) woven fabric; b) non-woven fabric; and c) knit fabric.

As a first step in the process according to the present invention, and as shown in FIG. 1, the pressure-sensitive and/or heat-sensitive adhesive 2 is cast to a uniformly thick layer on the release-coated carrier and subsequently allowed to dry. Subsequently, scrim 3 is introduced on top of the exposed adhesive surface, as shown in FIG. 2. Next, the substrate fabric 4 is introduced on top of the scrim 3, as shown in FIG. 3. It should be noted that while a cris-crossing pattern of yarns is shown in FIG. 2, other patterns, e.g., a parallel pattern, may be utilized.

Once the combination consisting of the substrate fabric 4, the scrim 3, the adhesive layer 2 and the carrier 1 has been assembled, the adhesive layer 2 is pushed into intimate contact with the substrate fabric through the scrim (or yarns) 3 by nipping the combination between rollers 31 and 32 under heat and/or pressure. An exemplary air-permeable fabric which may be used in the exemplary process is a polyester fleece; an exemplary scrim may be made of polypropylene material. Exemplary nipping conditions for a polyester fleece fabric and a polypropylene scrim may be 125° F. and 135 pli (pounds per lineal inch) pressure.

Once the nipping operation has been completed, the release-coated carrier 1 is stripped away, along with the scrim (or yarns) 3, from the substrate fabric 4 and the adhesive layer 2, thereby exposing a new adhesive surface which has a consistent pattern of discontinuity corresponding to the pattern of the removed scrim (or yarns) 3. Next, a second laminate layer, which may be another air-permeable fabric 5, as shown in FIG. 5, or a flexible polymeric film 6, as shown in FIG. 6, is bonded to the exposed adhesive surface with the pattern of discontinuity by means of a second nipping operation using the rollers. Using a polyester fleece as an example of the air-permeable fabric 5, exemplary conditions for this second nipping operation may be 140° F. and 30 pli pressure.

Figure 4:
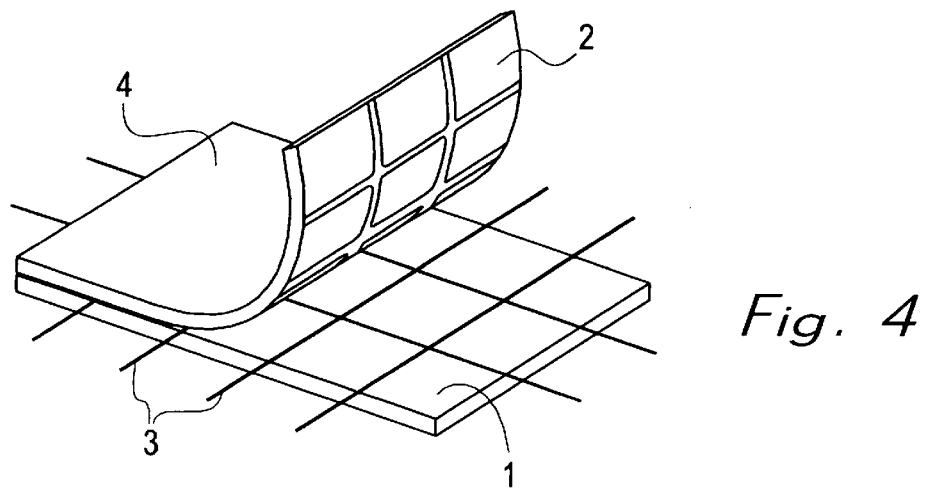
FIG. 4 illustrates a step of separating the first fabric layer with patterned adhesive layer from the carrier film/web combination.

In the above-described exemplary process, the yarns or scrim 3 inserted between the substrate fabric 4 and the adhesive layer 2, as shown in FIG. 3, may be varied in composition, construction (e.g., single-filament or multi-filament), thickness, and parallel spacing. Exemplary yarns or scrim 3 may be a low-cost type as long as the yarns or scrim exhibit sufficient tensile strength to be pulled through the adhesive layer, e.g., during the step shown in FIG. 4. Yarns of increasing cross-sectional area, or decreasing parallel spacing, yield increasing areas of voids in the resultant adhesive layer 2. As an example, industrial grade polyester sewing thread has been found to provide adequate performance. In addition, extruded polyolefin net materials have been found to be particularly suitable for use as the scrim 3. The scrim 3 allows for a nearly infinite variety of adhesive-void patterns and pattern densities. In addition, certain scrim or yarn patterns, e.g., diamond shaped patterns, facilitate smoother release from the adhesive layer during the step shown in FIG. 4.

The exemplary pressure-sensitive and/or heat-sensitive adhesive 2 is capable of durably bonding the air-permeable substrate fabric 4 to either another air-permeable fabric 5 or to the flexible polymeric film 6. In addition, the exemplary adhesive is also capable of remaining soft and flexible enough to yield laminates of desirable hand, drape and many cases, stretch. In the exemplary process according to the present invention, the chosen adhesive has either sufficient "green" tack (stickiness exhibited by an adhesive in its dried, but uncured, state) or adequate heat sealability to be: (a) properly transferred from the carrier 1 on which the adhesive is cast, to the substrate fabric 4; and then (b) properly bonded to the second substrate material, e.g., fabric 5 or polymeric film 6. Certain low modulus two component polyurethane adhesives have been found to satisfy all of these requirements. The thickness of the adhesive layer may be varied to accommodate particular fabrics in order to achieve a desired bond strength and/or fabric handle.

Lamination nip temperature and pressure parameters are largely dictated by the particular adhesive system and fabric construction used in the lamination process. Lamination nip temperature and pressure must be high enough to allow for adequate adhesive bond formation, yet not so high as to drive the adhesive layer deeply into the fabric substrate since doing so would result in unpredictable wind-barrier properties, rather than the desired wind-barrier properties typically sought from the non-void areas of the adhesive layer.

One of the key advantages of the lamination process according to the present invention is the ability to easily and precisely control the extent and pattern of adhesive voids left in a given fabric laminate as the result of temporarily utilizing a parallel-spaced or crisscrossing yarns, or a scrim, to impart the pattern of voids in an otherwise continuous layer of adhesive used to bond two laminate layers. Specific benefits of the process according to the present invention are dependent upon the nature of the laminate layers. For laminating a fabric to another fabric, benefits of the present invention include, among others: a) accurate control of wind resistance of the resulting laminate to specific target values; and b) ability to control the handle and drape of the resulting laminate. For laminating a fabric to a barrier film, the process according to the present invention enables accurate control of adhesive coverage/pattern to easily balance the bond strength against the following conflicting properties: a) moisture-vapor permeability, when a moisture vapor permeable film is used as one of the laminate layers; and b) soft handle and drape of the resulting laminate. Furthermore, the process according to the present invention is able to impart novel surface patterns and textures to the film layer.

While specific embodiments and steps have been described above, it should be readily apparent to those of ordinary skill in the art that the above-described embodiments and steps are exemplary in nature since certain changes may be made thereto without departing from the teachings of the invention, and the exemplary embodiments should not be construed as limiting the scope of protection for the invention as set forth in the appended claims. For example, although the scrims or sets of yarns have been shown to have a substantially rectangular, crisscrossing pattern, other patterns, e.g., parallel lines or a diamond-shaped pattern, may be utilized.

I claim:

1. A method for laminating a substrate fabric, comprising:
   introducing a pattern of yarns between said substrate fabric and an adhesive layer of substantially uniform thickness releasably carried on a carrier film;

pressing said adhesive layer into attachment with said substrate fabric through said pattern of yarns;

separating said carrier film and said pattern of yarns from said substrate fabric and said adhesive layer, surface of said adhesive layer exhibiting a pattern of discontinuity corresponding to said pattern of yarns; and attaching a second layer of material to said surface of said adhesive layer to form a laminate.

2. The method according to claim 1, wherein said step of pressing said adhesive layer into attachment with said substrate fabric through said pattern of yarns comprises nipping said carrier film, said adhesive layer, said pattern of yarns and said substrate fabric with opposing rollers.

3. The method according to claim 2, wherein said step of pressing said adhesive layer into attachment with said substrate fabric through said pattern of yarns further comprises applying one of heat and pressure.

4. The method according to claim 3, wherein said substrate fabric comprises one of a woven fabric, a non-woven fabric, and a knit fabric.

5. The method according to claim 4, wherein said step of attaching said second layer of material to said surface of said adhesive layer comprises nipping said second layer of material, said substrate fabric and said adhesive layer with opposing rollers.

6. The method according to claim 5, wherein said second layer of material comprises one of a woven fabric, a non-woven fabric, a knit fabric and a flexible polymeric film.

7. The method according to claim 6, wherein said adhesive is one of a pressure-sensitive adhesive and a heat-sensitive adhesive.

8. The method according to claim 1, wherein said pattern of yarns comprises one of a rectangular pattern, a diamond-shaped pattern and a set of parallel lines.

9. The method according to claim 8, wherein said second layer of material comprises one of a fabric and a polymeric film.

10. The method according to claim 9, wherein said second layer of material comprises one of a woven fabric, a non-woven fabric, a knit fabric and a flexible polymeric film.

11. The method according to claim 10, wherein said adhesive is one of a pressure-sensitive adhesive and a heat-sensitive adhesive.

12. The method according to claim 11, wherein said step of pressing said adhesive layer into attachment with said substrate fabric through said pattern of yarns comprises nipping said carrier film, said adhesive layer, said pattern of yarns and said substrate fabric with opposing rollers, and wherein said step of attaching said second layer of material to said surface of said adhesive layer comprises nipping said second layer of material, said substrate fabric and said adhesive layer with opposing rollers.

13. The method according to claim 12, wherein said step of pressing said adhesive layer into attachment with said substrate fabric through said pattern of yarns further comprises applying one of heat and pressure.

14. The method according to claim 1, wherein said step of pressing said adhesive layer into attachment with said substrate fabric through said pattern of yarns further comprises applying one of heat and pressure.

15. The method according to claim 14, wherein said adhesive is one of a pressure-sensitive adhesive and a heat-sensitive adhesive.

16. The method according to claim 15, wherein said step of pressing said adhesive layer into attachment with said substrate fabric through said pattern of yarns comprises nipping said carrier film, said adhesive layer, said pattern of yarns and said substrate fabric with opposing rollers while applying one of heat and pressure.

17. The method according to claim 16, wherein said step of applying one of heat and pressure comprises selecting heat temperature and pressure to achieve adequate adhesive bond formation while preventing penetration of said adhesive layer deeply into said substrate fabric.

18. The method according to claim 17, wherein said yarns comprise one of polyester thread and extruded polyolefin material.

19. The method according to claim 18, wherein said substrate fabric comprises one of a woven fabric, a non-woven fabric, and a knit fabric, and wherein said second layer of material comprises one of a woven fabric, a non-woven fabric, a knit fabric and a flexible polymeric film.

20. The method according to claim 19, wherein said pattern of yarns comprises one of a rectangular pattern, a diamond-shaped pattern and a set of parallel lines, and wherein said step of attaching said second layer of material to said surface of said adhesive layer comprises nipping said second layer of material, said substrate fabric and said adhesive layer with opposing rollers while applying heat and pressure.

* * * * *

UNITED STATES PATENT AND TRADEMARK OFFICE
CERTIFICATE OF CORRECTION

Page 1 of 1

PATENT NO. : 6,190,482 B1
DATED : February 20, 2001
INVENTOR(S) : Thomas Colasanto It is certified that error appears in the above-identified patent and that said Letters Patent is hereby corrected as shown below:

<u>Column 4,</u>
Line 6, please change "hand" to -- handle --.

Signed and Sealed this

Fourth Day of December, 2001

Attest:

*Nicholas P. Godici*

NICHOLAS P. GODICI
*Attesting Officer*     *Acting Director of the United States Patent and Trademark Office*